United States Patent
Sano

(10) Patent No.: US 10,871,767 B2
(45) Date of Patent: Dec. 22, 2020

(54) PRODUCTION CONTROL SYSTEM, PRODUCTION CONTROL PROGRAM, AND PRODUCTION CONTROL METHOD FOR IDENTIFYING A PLURALITY OF WORKPIECES

(71) Applicant: TOYOTA JIDOSHA KABUSHIKI KAISHA, Toyota (JP)

(72) Inventor: Yohei Sano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 15/954,915

(22) Filed: Apr. 17, 2018

(65) Prior Publication Data

US 2018/0335768 A1  Nov. 22, 2018

(30) Foreign Application Priority Data

May 16, 2017  (JP) .................................. 2017-097099

(51) Int. Cl.
   *G05B 19/418*  (2006.01)

(52) U.S. Cl.
   CPC .............. *G05B 19/4183* (2013.01); *G05B 2219/45054* (2013.01); *G05B 2219/49302* (2013.01)

(58) Field of Classification Search
   CPC ...... G05B 19/4183; G05B 2219/45054; G05B 2219/49302; G05B 2219/32252; G05B 19/41865
   See application file for complete search history.

(56) References Cited

U.S. PATENT DOCUMENTS

| | | | | |
|---|---|---|---|---|
| 5,673,194 A * | 9/1997 | Cipelletti | ........... | G05B 19/4183 700/115 |
| 5,993,081 A * | 11/1999 | Itoh | ........... | G03F 7/7075 396/611 |
| 6,381,509 B1 * | 4/2002 | Thiel | ........... | G06Q 10/06 700/115 |
| 7,793,292 B2 * | 9/2010 | Worek | ........... | G05B 19/4183 700/17 |
| 2006/0138653 A1 * | 6/2006 | Miwa | ........... | G06K 19/0723 257/728 |
| 2006/0149407 A1 * | 7/2006 | Markham | ........... | B23Q 35/12 700/108 |

(Continued)

FOREIGN PATENT DOCUMENTS

| | | |
|---|---|---|
| JP | 10-39907 A | 2/1998 |
| JP | 2002-41124 A | 2/2002 |

(Continued)

*Primary Examiner* — James J Lee
*Assistant Examiner* — Shon G Foley
(74) *Attorney, Agent, or Firm* — Sughrue Mion, PLLC

(57) ABSTRACT

A production control system includes a plurality of processing machines configured to successively process a plurality of workpieces conveyed on a production line, and a system server connected to the plurality of processing machines, in which the system server acquires an operating status associated with a time from each of the plurality of processing machines, associates the acquired operating statuses with the plurality of workpieces successively arriving at the processing machines, and thereby identifies each of the plurality of workpieces conveyed on the production line.

10 Claims, 14 Drawing Sheets

(56) References Cited

U.S. PATENT DOCUMENTS

| | | | | |
|---|---|---|---|---|
| 2006/0149412 A1* | 7/2006 | Fujishima | ........... | G05B 19/4183 |
| | | | | 700/169 |
| 2007/0074006 A1* | 3/2007 | Martinez | ............... | G06F 9/3842 |
| | | | | 712/218 |
| 2008/0147223 A1* | 6/2008 | Erickson | .......... | G05B 19/41865 |
| | | | | 700/108 |
| 2018/0299870 A1* | 10/2018 | Lo | .................... | G05B 19/41895 |
| 2018/0356804 A1* | 12/2018 | Oka | ................ | G06Q 10/06315 |

FOREIGN PATENT DOCUMENTS

| | | |
|---|---|---|
| JP | 2004-134509 A | 4/2004 |
| JP | 2006-252433 A | 9/2006 |
| JP | 2012-053805 A | 3/2012 |
| JP | 2013-178824 A | 9/2013 |
| JP | 2014-002705 A | 1/2014 |
| JP | 2017-010236 A | 1/2017 |
| WO | 2017/078730 A1 | 5/2017 |

* cited by examiner

| STEP K | |
|---|---|
| 2016/11/12 13:02:01 | NORMAL PROCESS |
| 2016/11/12 13:02:35 | OCCURRENCE OF ABNORMAL STOP |
| 2016/11/12 13:06:15 | NORMAL PROCESS |
| 2016/11/12 13:06:52 | OCCURRENCE OF ARBITRARY STOP |
| 2016/11/12 13:07:10 | NORMAL PROCESS |
| 2016/11/12 13:07:53 | NORMAL PROCESS |
| ⋮ | ⋮ |

| OCCURRENCE STEP | STEP K |
| --- | --- |
| TAKING-OUT TIME | 2016/11/12 13:02:40 |
| RE-PUTTING TIME | 2016/11/12 13:06:32 |

Fig. 10B

| OCCURRENCE STEP | STEP K |
| --- | --- |
| TAKING-OUT TIME | 2016/11/12 13:02:40 |
| TAKING-OUT PERIOD | 3 MIN 52 SEC |

| STEP K | |
|---|---|
| 2016/11/12 13:02:01 | NORMAL PROCESS |
| 2016/11/12 13:02:35 | OCCURRENCE OF ABNORMAL STOP |
| 2016/11/12 13:06:15 | NORMAL PROCESS |
| 2016/11/12 13:06:52 | OCCURRENCE OF ABNORMAL STOP |
| 2016/11/12 13:07:10 | NORMAL PROCESS |
| 2016/11/12 13:07:53 | OCCURRENCE OF ARBITRARY STOP |
| 2016/11/12 13:08:05 | NORMAL PROCESS |
| 2016/11/12 13:08:20 | OCCURRENCE OF ARBITRARY STOP |
| 2016/11/12 13:08:30 | NORMAL PROCESS |
| ⋮ | ⋮ |

Fig. 13

| OCCURRENCE STEP | STEP K | STEP K |
|---|---|---|
| TAKING-OUT TIME | 2016/11/12 13:02:40 | 2016/11/12 13:06:55 |
| RE-PUTTING TIME | 2016/11/12 13:08:25 | 2016/11/12 13:07:55 |
| TEMPORARY ID | k001 | k002 |

Fig. 14

PRODUCTION CONTROL SYSTEM, PRODUCTION CONTROL PROGRAM, AND PRODUCTION CONTROL METHOD FOR IDENTIFYING A PLURALITY OF WORKPIECES

CROSS REFERENCE TO RELATED APPLICATIONS

This application is based upon and claims the benefit of priority from Japanese patent application No. 2017-97099, filed on May 16, 2017, the disclosure of which is incorporated herein in its entirety by reference.

BACKGROUND

The present disclosure relates to a production control system, a production control program, and a production control method.

The following technique has been known; namely, a technique used in a production system in which workpieces are processed through a plurality of steps while being conveyed on a production line, i.e., a technique in which an overall progress in a production system as well as a processing state in each step are shown to a manager of the production system based on an order of steps to be controlled and time periods spent in these steps (see, for example, Japanese Unexamined Patent Application Publication No. 2012-53805 (hereinafter referred to as Patent Literature 1)).

SUMMARY

The present inventors have found the following problem. A technique in which individual IDs are assigned to a plurality of workpieces conveyed on a production line by sticking tags such as RFIDs on the workpieces in order to identify each of the plurality of workpieces has been known. However, in the case where workpieces themselves are pressed or cut, sticking adhesive labels or the like on the workpieces is not realistic. Even when the technique disclosed in Patent Literature 1 is applied for identification of workpieces, there is a problem that since workpieces are identified based solely on the order of steps and time periods spent in these steps, the order of workpieces to be identified becomes out of sync when some of them are taken out from the production line due to defects or the like.

The present disclosure has been made to solve the above-described problem and an object thereof is to provide a production control system and the like capable of appropriately identifying a plurality of workpieces conveyed on a production line and thereby, for example, performing a different manufacturing process and/or a different inspection for each of the workpieces.

A first exemplary aspect is a production control system including: a plurality of processing machines configured to successively process a plurality of workpieces conveyed on a production line; and a system server connected to the plurality of processing machines, in which the system server acquires an operating status associated with a time from each of the plurality of processing machines, associates the acquired operating statuses with the plurality of workpieces successively arriving at the processing machines, and thereby identifies each of the plurality of workpieces conveyed on the production line.

By using operating statuses of processing machines as described above, it is possible to identify individual workpieces even when some of the workpieces are taken out from the production line due to defects or the like. Further, since there is no need to stick an ID tag on each workpiece, it is possible to perform presswork or the like for the workpieces. Further, it is also possible to perform a different manufacturing process and/or a different inspection for each workpiece.

Further, in the above-described production control system, when the system server acquires an operating status indicating an interruption of an operation from one of the plurality of processing machines, it may recognize that a workpiece corresponding to that processing machine has been taken out from the production line. Further, the system server may advance the order of a workpiece that has been conveyed subsequent to the workpiece taken out from the production line and thereby associate an operating status acquired from a processing machine disposed on a downstream side of that processing machine with the advanced workpiece. In the case where one workpiece is processed in each processing machine, it is possible to interpret an interruption of an operation due to detection of an abnormality or an interruption of an operation in response to an instruction from a user such as a manager and a person in charge of the production line as an occurrence of some kind of defect in a workpiece and thereby manage the production line on the assumption that that workpiece has been taken out. By associating an interruption with a removal of a workpiece in such a simple manner, it is possible to achieve reliable identification of individual workpieces.

Further, when the system server recognizes that one of a plurality of workpieces has been taken out from one of the plurality of processing machines, it may acquire a taking-out elapsed time that is a time elapsed before that workpiece is put onto the production line again, associate an operating status associated with an earliest time after the taking-out elapsed time has elapsed from a time associated with an interruption of an operation with the re-put workpiece, and thereby identify that workpiece that is conveyed on the production line again. By acquiring time information, even when a plurality of workpieces are simultaneously taken out, it is possible to correctly identify (i.e., recognize) that each of these workpieces has been put onto the production line again. In such a case, the above-described production control system may include an operation terminal configured to transmit time information to the system server in response to an operation performed by a user. When a user possesses such an operation terminal, it is possible to save the user trouble of operating each of the processing machines and thereby to achieve an efficient operation of the production line.

Further, when one of the plurality of workpieces has been taken out from one of the plurality of processing machines but the system server has not been able to recognize that the workpiece has been put onto the production line again before a predetermined time has elapsed, the system server may regard that workpiece as being a discarded workpiece. By managing the production line as described above, it is possible to appropriately recognize a workpiece that has taken out from a processing machine but is not returned to the production line and thereby reliably identify workpieces that are normally processed.

Further, the above-described production control system may include an integration server connected to the system server and the system server may transfer identification information of the plurality of workpieces to the integration server at a predetermined timing. By providing a host server (i.e., an integration server) as described above, it is possible to control a plurality of system servers that manages their respective production lines in a centralized manner and apply a processing condition or the like that is set to correct a defect that has occurred in one production line to other production lines. Further, it is possible to manage, for example, all the workpieces in a factory by managing identification information of the workpieces in a centralized manner by using an integration server connected to system servers through the Internet.

In such a case, the integration server may regard, among the plurality of workpieces, a workpiece that has been taken out from one of the plurality of processing machines but has not been recognized as having been put onto the production line again as being a discarded workpiece based on the identification information. By adopting the above-described configuration, since determinations about discarding of workpieces are made in the integration server, the production control system does not cause any workpiece whose whereabouts is unknown.

Further, at least one of the plurality of processing machines may perform a predetermined process for each of the plurality of workpieces based on an identification status in the system server. According to the above-described production control system, since individual workpieces are appropriately identified, it is possible to perform a different process for each of the workpieces. That is, it is possible to perform various manufacturing processes or other processes for a number of different types of products by using one production line.

A second exemplary aspect is a production control program adapted to be executed by a system server connected to a plurality of processing machines, the plurality of processing machines being configured to successively process a plurality of workpieces conveyed on a production line, the production control program being adapted to cause the system server to perform: an acquisition step of acquiring an operating status associated with a time from each of the plurality of processing machines; and an identification step of identifying each of the plurality of workpieces conveyed on the production line based on the acquired operating statuses. By executing the above-described program by a system server, it is possible to identify individual workpieces even when some of the workpieces are taken out from the production line due to defects or the like. Further, since there is no need to stick an ID tag on each workpiece, it is possible to perform presswork or the like for the workpieces. Further, it is also possible to perform a different manufacturing process and/or a different inspection for each workpiece.

A third exemplary aspect is a production control method using a plurality of processing machines and a system server connected to the plurality of processing machines, the plurality of processing machines being configured to successively process a plurality of workpieces conveyed on a production line, the production control method including: an acquisition step of acquiring, by the system server, an operating status associated with a time from each of the plurality of processing machines; and an identification step of identifying, by the system server, each of the plurality of workpieces conveyed on the production line based on the acquired operating statuses. By adopting the above-described production control method, it is possible to identify individual workpieces even when some of the workpieces are taken out from the production line due to defects or the like. Further, since there is no need to stick an ID tag on each workpiece, it is possible to perform presswork or the like for the workpieces. Further, it is also possible to perform a different manufacturing process and/or a different inspection for each workpiece.

According to the present disclosure, it is possible to provide a production control system and the like capable of appropriately identifying a plurality of workpieces conveyed on a production line and thereby, for example, performing a different manufacturing process and/or a different inspection for each of the workpieces.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 9 is a table showing an example of operating statuses of a processing machine in which a defect has occurred;

FIG. 10A is a diagram showing an example of terminal information for a workpiece in which a defect has occurred;

FIG. 10B is a diagram showing an example of terminal information for a workpiece in which a defect has occurred;

FIG. 13 is a table showing another example of operating statuses of a processing machine in which a defect has occurred;

FIG. 14 is a diagram showing another example of terminal information for a workpiece in which a defect has occurred;

DESCRIPTION OF EMBODIMENTS

The present disclosure is explained hereinafter by using embodiments. However, the present disclosure according to the claims is not limited to the below-shown embodiments.

Further, each of the components explained in the embodiments is not necessarily indispensable as means for solving the problem.

Figure 1:
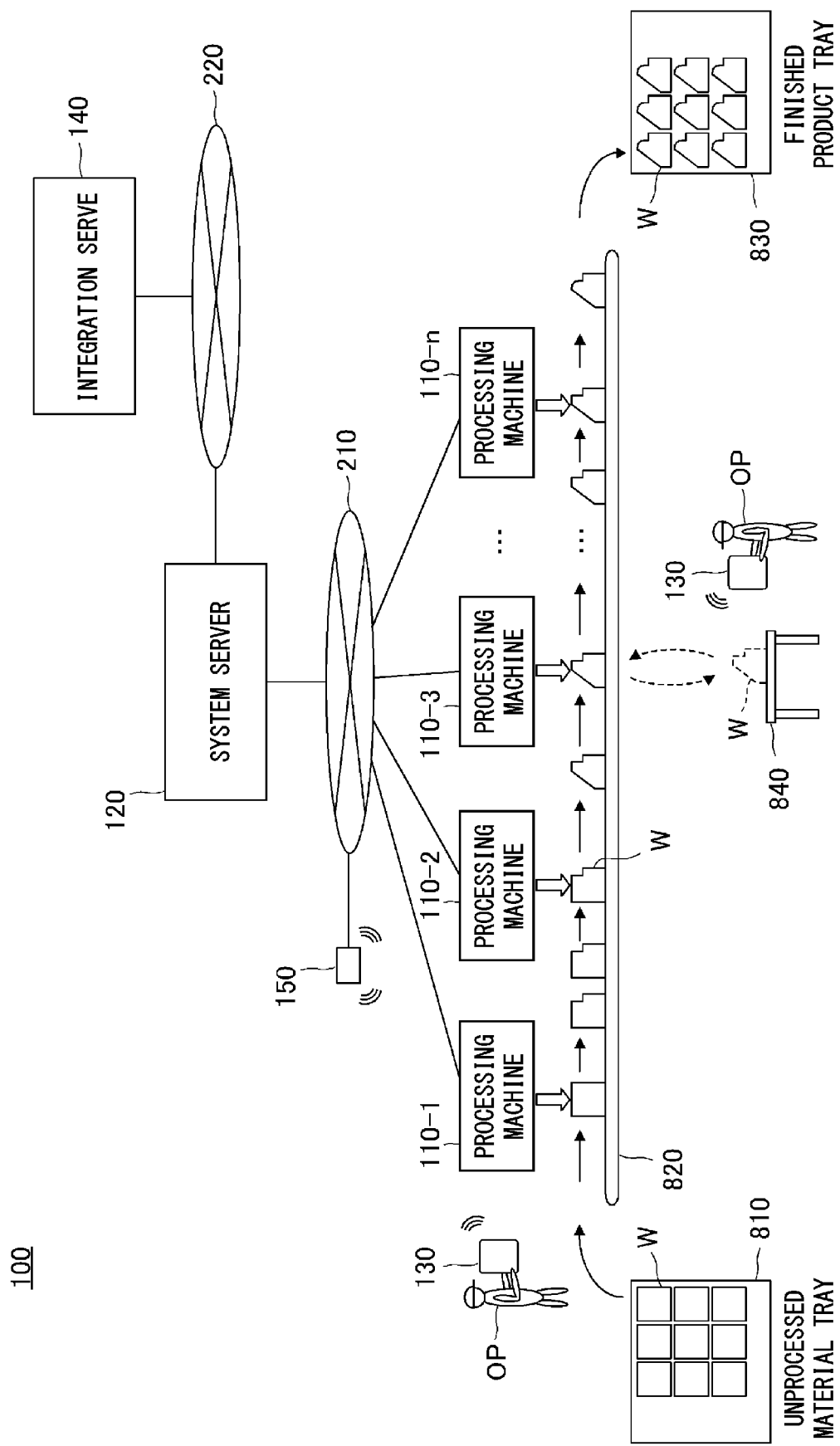
FIG. 1 is an overall conceptual diagram of an overall configuration of a production control system.

FIG. 1 is an overall conceptual diagram of an overall configuration of a production control system 100. The production control system 100 according to this embodiment is a system that controls and manages a production line through which, for example, metal raw materials are shaped into shaped articles and the shaped articles are inspected as to whether they are within a tolerance range.

Unprocessed workpieces W contained in an unprocessed material tray 810 are taken out one by one and successively put onto a production line 820. Then, they are processed by processing machines 110 (110-1, 110-2, . . . , 110-n) corresponding to first to n-th steps, respectively, and are contained in a finished product tray 830 as finished products. Each of the processing machines 110 processes workpieces conveyed on the production line 820 one by one. Each of the processing machines 110 is connected to an intranet 210. Further, a system server 120 is also connected to the intranet 210 and transmits/receives information and control instructions to/from each of the processing machines 110.

Each of the processing machines 110 may be, for example, a presswork machine that shapes workpieces into desired shapes, a measurement/inspection device that measures and inspects shaped workpieces, or the like. In the case where a process performed in a processing machine 110 is a manufacturing process, all the workpieces W are not necessarily manufactured as desired. Further, in the case where a process performed in a processing machine 110 is a measurement/inspection process, all the shaped workpieces W do not necessarily fall within a tolerance range. Therefore, for example, when an abnormality occurs in presswork of a workpiece W or a workpiece W that does not fall within a tolerance range is detected, the processing machine 110 stops its operation and urges an operator OP, i.e., a manager of the production line to check the workpiece W and/or fix the problem.

When a processing machine 110 is stopped, a workpiece W that has been processed by that processing machine 110 is taken out from the production line 820 (an elimination) and some kind of measure is taken for the taken-out workpiece on an operation table 840 located outside the production line. After the measure is taken, if the operator OP has determined that the workpiece W can be returned to the production line 820, the workpiece W is returned to the processing machine 110 and conveyed on the production line 820 again.

The operator OP carries an operation terminal 130, which is, for example, a tablet terminal, and enters a record of the eliminated workpiece W into the operation terminal 130. The entered information is sent to the system server 120 through a wireless router 150 connected to the intranet 210. Further, when the operator OP takes out unprocessed workpieces W from the unprocessed material tray 810 and puts them onto the production line 820, he/she may enter the number of workpieces W put onto the production line 820 and a time at which they are put onto the production line 820 into the operation terminal 130 and thereby send these information pieces to the system server 120. Similarly, when the operator OP collects workpieces W from the production line 820 and puts them into the finished product tray 830 as finished products, he/she may enter the number of workpieces W collected from the production line 820 and a time at which they are taken out and collected into the operation terminal 130 and thereby send these information pieces to the system server 120. By sending above-described information to the system server 120 at the time of putting them on the production line and at the time of collecting them from the production line, it is possible to improve accuracy of identification and management of workpieces W (which will be described later).

Note that the connection between each processing machine 110 and the intranet 210 may be a wireless connection through the wireless router 150 and the connection between each operation terminal 130 and the intranet 210 may be a wired connection. Further, the network through which the system server 120, each processing machine 110, and each operation terminal 130 are connected may be the Internet 220.

The system server 120 is connected to an integration server 140 through the Internet 220. The integration server 140 is connected to, for example, other system servers 120 that manage other production lines in a factory, in addition to the system server 120 in the production control system 100 shown in the figure. The integration server 140 collects various information items about processes for workpieces W from each system server 120, manages the workpieces W, performs analyses to improve the processing steps, and so on.

Figure 2:
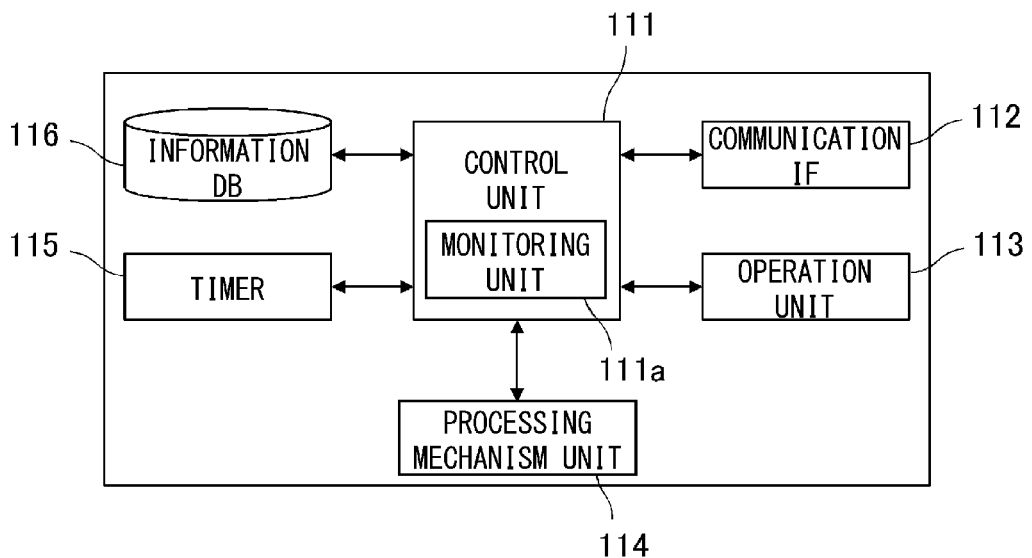
FIG. 2 is a block diagram showing a configuration of each processing machine.

FIG. 2 is a block diagram showing a configuration of each processing machine 110. The processing machine 110 includes, mainly, a control unit 111, a communication IF 112, an operation unit 113, a processing mechanism unit 114, a timer 115, and an information DB 116. The control unit 111 is, for example, a CPU and controls the overall operation of the processing machine 110. The communication IF 112 is an interface for connection to the intranet 210. For example, the communication IF 112 is a LAN unit. The operation unit 113 receives an operation performed by the operator OP. For example, the operation unit 113 is push buttons or a touch panel. The operation unit 113 receives instructions on a stop and a restart of the operation and transfers them to the control unit 111.

The processing mechanism unit 114 is a mechanism unit that performs a process performed in a step which the processing machine is in charge of. For example, when the processing machine is a presswork machine, the processing mechanism unit 114 is a pressing mechanism. The timer 115 is a clock for specifying a process execution time and a stop time for the processing mechanism unit 114. By using the time information held by the timer 115, all the processing machines 110 are synchronized with each other through the intranet 210. The information DB 116 is, for example, an HDD and is a storage unit that stores an operating status of the processing machine 110.

A monitoring unit 111a serves as a function execution unit of the control unit 111 and monitors the operating status of the processing machine 110. Specifically, the monitoring unit 111a generates an operating status such as whether the processing mechanism unit 114 has normally performed a process, whether the processing mechanism unit 114 has detected an abnormality and abnormally stopped, or whether the processing mechanism unit 114 has arbitrarily stopped in response to an operation performed in the operation unit 113 in association with a time of an occurrence of such an event acquired from the timer 115. The generated operating status is, depending on a circumstance such as a communication state, temporarily stored in the information DB 116 and then sent to the system server 120. Alternatively, the generated operating status is directly transmitted to the system server 120.

Figure 3:
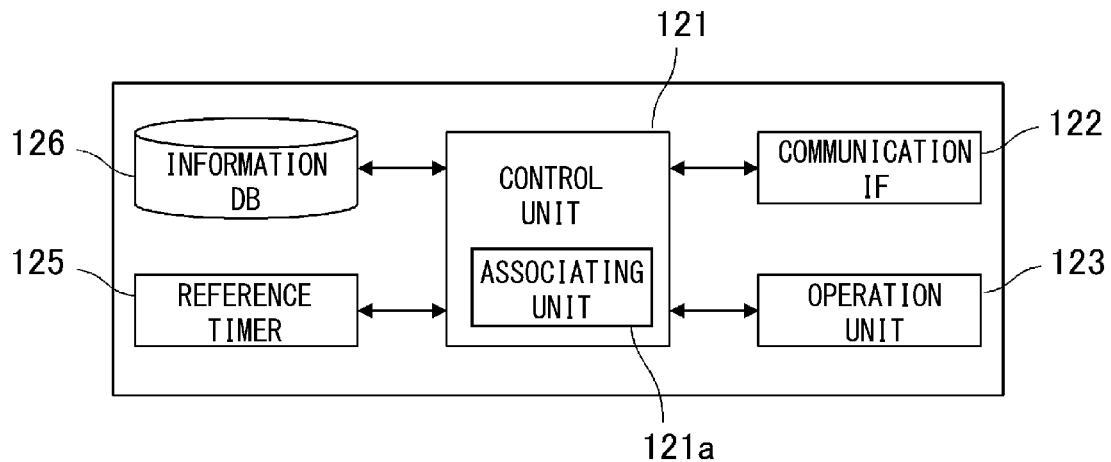
FIG. 3 is a block diagram showing a configuration of a system server.

FIG. 3 is a block diagram showing a configuration of the system server 120. The system server 120 includes, mainly, a control unit 121, a communication IF 122, an operation unit 123, a reference timer 125, and a management DB 126. The control unit 121 is, for example, a CPU and controls the overall operation of the system server 120. The communication IF 122 is an interface for connection to the intranet 210 and the Internet 220. For example, the communication IF 122 is a LAN unit. The operation unit 123 receives an operation performed by a system administrator. For example, the operation unit 123 is a keyboard. The operation unit 123 receives a change in a setting or the like and transfers it to the control unit 111.

The reference timer 125 holds a common reference time used in the production control system 100. The reference time is transmitted to the processing machines 110 and the operation terminals 130 through the intranet 210 and times in all the processing machines 110 and all the operation terminals 130 related to the workpieces W conveyed on the production line 820 are synchronized with each other. The management DB 126 is, for example, an HDD and is a storage unit that stores an operating status and the like sent from each processing machine 110 and stores identification information of workpieces W managed by the production control system 100.

An associating unit 121a serves as a function execution unit of the control unit 121. The associating unit 121a associates workpieces W conveyed on the production line 820 with identifiers ID by using operating statuses sent from respective processing machines 110 and terminal information sent from the operation terminal 130 and identifies each of the workpieces W. The identifiers ID associated with workpieces W are stored in the management DB as identification information that includes processing times at which processes are performed by respective processing machine 110.

Figure 4:
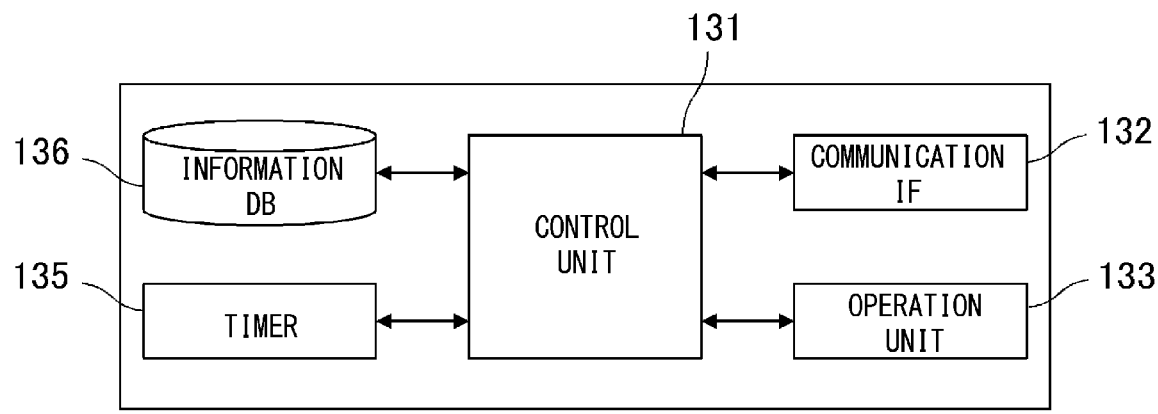
FIG. 4 is a block diagram showing a configuration of an operation terminal.

FIG. 4 is a block diagram showing a configuration of the operation terminal 130. The operation terminal 130 includes, mainly, a control unit 131, a communication IF 132, an operation unit 133, a timer 135, and a terminal DB 136. The control unit 131 is, for example, a CPU and controls the overall operation of the operation terminal 130. The communication IF 132 is an interface for connection to the intranet 210. For example, the communication IF 132 is a Wi-Fi (Registered Trademark) unit. The operation unit 133 receives an operation performed by a system administrator. For example, the operation unit 133 is push buttons or a touch panel. The operation unit 133 receives timing inputs or the like related to taking-out (i.e., removal) and re-putting of a workpiece W and transfers them to the control unit 111.

The timer 135 is a clock for specifying a time or the like related to taking-out and re-putting of a workpiece W. By the time information held by the timer 135, all the operation terminals 130 are synchronized through the intranet 210. The terminal DB 136 is, for example, an HDD and is a storage unit that stores terminal information that is obtained by compiling times and the like related to taking-out and re-putting of workpieces W.

Figure 5:
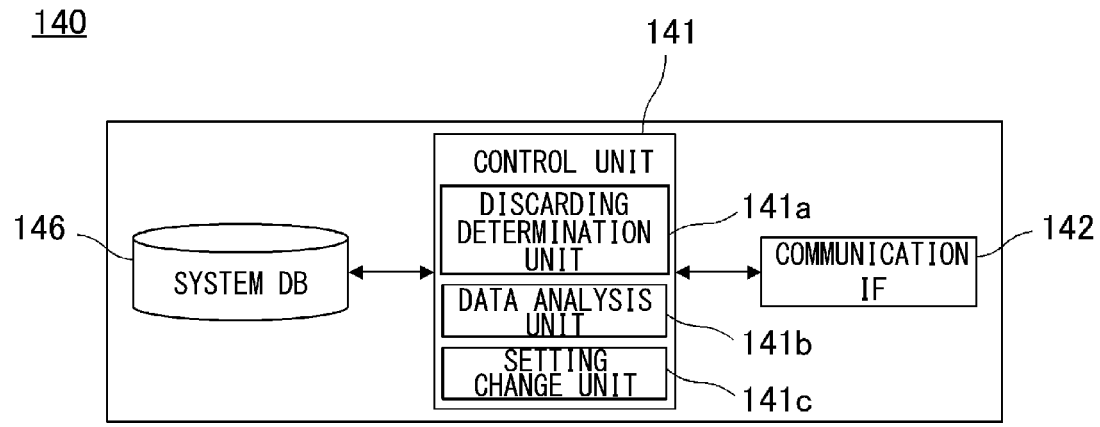
FIG. 5 is a block diagram showing a configuration of an integration server.

FIG. 5 is a block diagram showing a configuration of the integration server 140. The integration server 140 includes, mainly, a control unit 141, a communication IF 142, and a system DB 146. The control unit 141 is, for example, a CPU and controls the overall operation of the integration server 140. The communication IF 142 is an interface for connection to the Internet 220. For example, the communication IF 142 is a LAN unit. The system DB 146 is, for example, an HDD and is a storage unit that stores identification information of workpieces W and operating statuses or the like of respective processing machines 110 sent from each system server 120.

The control unit 121 serves as a function execution unit and functions as a discarding determination unit 141a, a data analysis unit 141b, and a setting change unit 141c. The discarding determination unit 141a determines whether or not a workpiece W whose whereabouts is uncertain is regarded as being a discarded workpiece W by referring to collected information. The data analysis unit 141b analyzes a condition or the like under which a defect occurs by referring to an operating status of each processing machine 110. The setting change unit 141c defines an optimal setting for a processing machine 110 of interest based on the analysis made by the data analysis unit 141b and changes the setting of the processing machine 110 of interest to the optimal setting through the system server 120.

Figure 6:
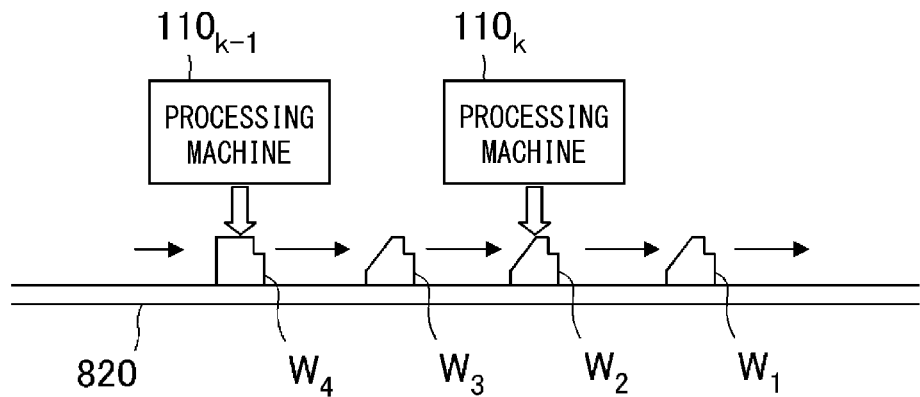
FIG. 6 is a conceptual diagram showing a state in which workpieces are conveyed on a production line.

Next, identification of workpieces W conveyed on the production line 820 is explained. FIG. 6 is a conceptual diagram showing a state in which workpieces W are conveyed on the production line 820. In the following explanation, attention is paid to, among a plurality of processing machines 110, a processing machine $110_{k-1}$ in charge of a process in a step K-1, i.e., a (k-1)th step and a processing machine $110_k$ in charge of a process in a step K, i.e., the step subsequent to the (k-1)th step.

A plurality of workpieces W are being conveyed on the production line 820 in the order of workpieces $W_1$, $W_2$, $W_3$, $W_4$. In the figure, a process for the workpiece $W_1$ in the processing machine $110_k$ has been finished and the workpiece $W_1$ is being sent to the next step. The workpiece $W_2$ is being subjected to a process in the processing machine $110_k$. A process for the workpiece $W_3$ in the processing machine $110_{k-1}$ has been finished and the workpiece $W_3$ is waiting for a process in the processing machine $110_k$ to be performed thereon. Further, the workpiece $W_4$ is being subjected to a process in the processing machine $110_{k-1}$. As described above, each of the processing machines $110_{k-1}$ and $110_k$ processes one workpiece W at a time.

Figure 7:
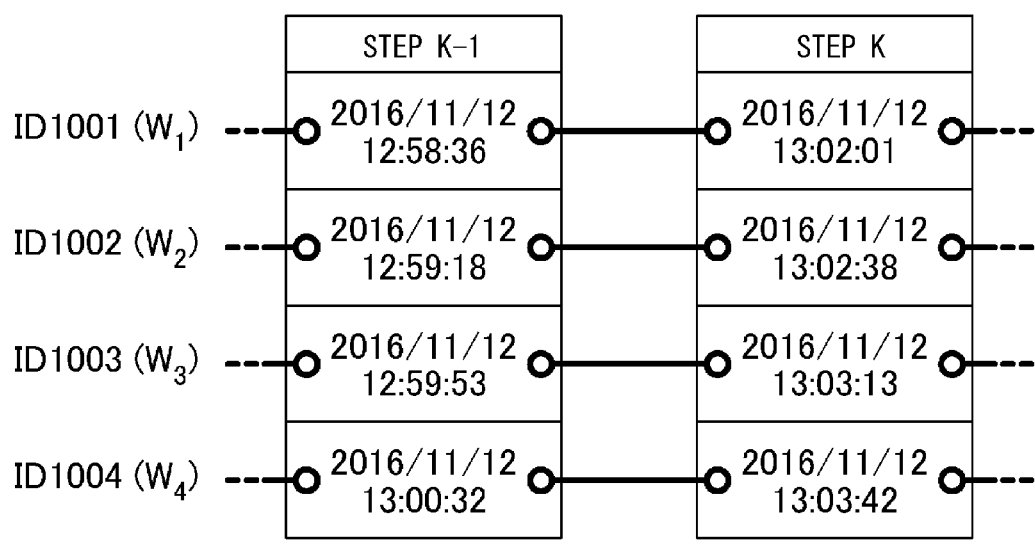
FIG. 7 is a diagram for explaining association of workpieces when the workpieces are normally conveyed.

When a process for each workpiece is performed by the processing machines $110_{k-1}$ and $110_k$ without any problem, the workpieces $W_1$, $W_2$, $W_3$, $W_4$, ... are normally conveyed on the production line 820 in order. FIG. 7 is a diagram for explaining association of workpieces when the workpieces are normally conveyed.

As shown in FIG. 6, when the workpieces $W_1$, $W_2$, $W_3$, $W_4$, are normally conveyed on the production line 820, the associating unit 121a of the system server 120 can associate (i.e., assign) identifiers ID1001, ID1002, ID1003, ID1004, ... with the workpieces $W_1$, $W_2$, $W_3$, $W_4$, ..., respectively, in order. More specifically, for example, as shown in the figure, assume that information pieces indicating that normal processes have been successively performed at 12:58:36, 12:59:18, 12:59:53, and 13:00:32 have been obtained as operating statuses of the processing machine $110_{k-1}$ in charge of the step K-1, and information pieces indicating that normal processes have been successively performed at 13:02:01, 13:02:38, 13:03:13, and 13:03:42 have been obtained as operating statuses of the processing machine $110_k$ in charge of the step K. In this case, it can be determined that the workpiece $W_1$ passed through the step K-1 at 12:58:36 and passed through the step K at 13:02:01. Further, it is possible to associate an identifier ID1001 with the workpiece $W_1$. Similarly, it can be determined that the workpiece $W_2$ passed through the step K-1 at 12:59:18 and passed through the step K at 13:02:38 and it is possible to associate an identifier ID1002 with the workpiece $W_2$.

Further, it can be determined that the workpiece $W_3$ passed through the step K−1 at 12:59:53 and passed through the step K at 13:03:13 and it is possible to associate an identifier ID1003 with the workpiece $W_3$. Further, it can be determined that the workpiece $W_4$ passed through the step K−1 at 13:00:32 and passed through the step K at 13:03:42 and it is possible to associate an identifier ID1004 with the workpiece $W_4$.

That is, even when ID tags or the like are not stuck on workpieces W themselves in advance, the control unit 121 of the system server 120 can associate an identifier ID with each workpiece W, provided that the control unit 121 can recognize times at which normal processes are performed in each processing machine 110. Therefore, it is possible to identify and keep track of each workpiece on the production line 820. However, workpieces W are not necessarily normally processed in each processing machine 110 at all times. That is, a defect could sometimes occur in any of the processing machines 110. For example, in the case where the processing machine 110 is a presswork machine, an abnormality could occur in presswork for a workpiece W. In such a case, an operator OP takes out that workpiece W from the processing machine 110. Then, he/she inspects the workpiece W for the abnormality and/or manually repairs the workpiece W. When the workpiece W is taken out from the production line 820 as described above, the order of workpieces W conveyed on the production line 820 changes and hence the association between workpieces W and identifiers ID shown in FIG. 7 does not hold any longer. Therefore, in this embodiment, identifiers ID are correctly associated with workpieces W by using operating statuses in each processing machine 110.

Figure 8A:
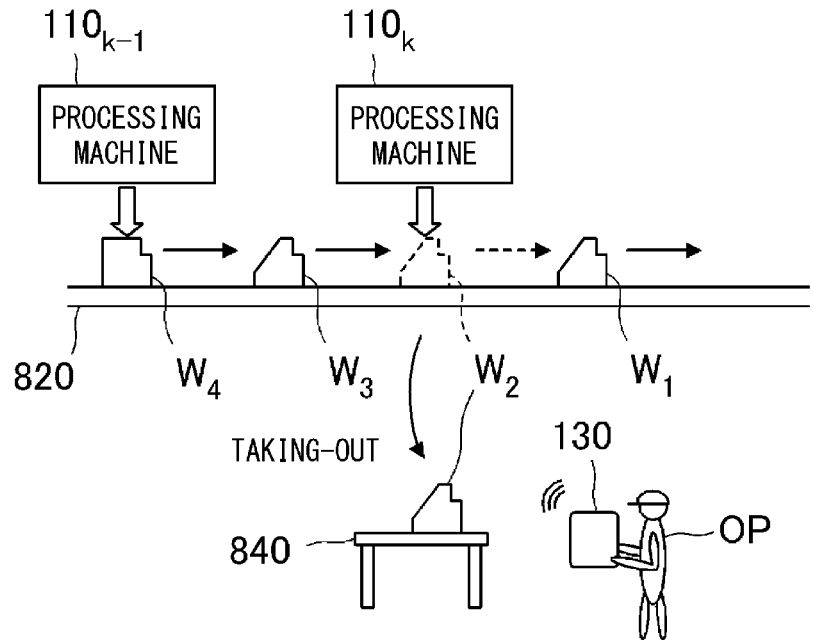
FIG. 8A is a conceptual diagram showing a state in which workpieces are being conveyed on a production line after a defect has occurred in a workpiece.
Figure 8B:
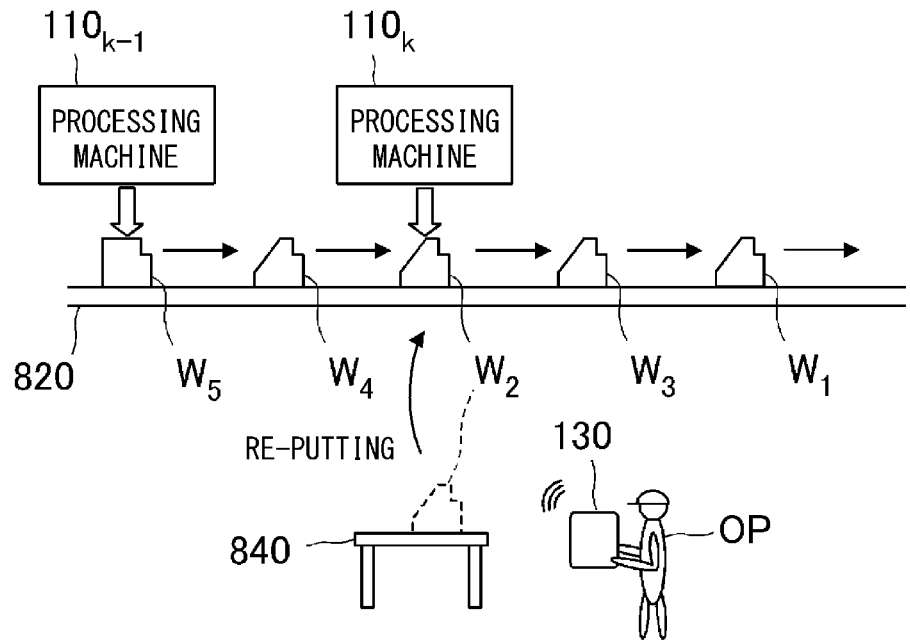
FIG. 8B is a conceptual diagram showing a state in which workpieces are being conveyed on a production line after a defect has occurred in a workpiece.

FIGS. 8A and 8B are conceptual diagrams showing states in which workpieces W are being conveyed on the production line 820 after a defect has occurred in a workpiece W. FIG. 8A shows a state in which a defect occurred when the workpiece $W_2$ was being processed in the processing machine $110_k$ and the workpiece $W_2$ was taken out from the production line 820 and transferred onto an operation table 840. It is assumed that the workpiece $W_1$ was normally processed in the processing machine $110_k$ and is being moved toward the next step.

When the monitoring unit 111a of the processing machine $110_k$ detects an occurrence of a defect during the process, it performs an abnormal stop and thereby interrupts the process for the workpiece $W_2$. Alternatively, when an operator OP founds an abnormal process, the operator OP abnormally stops the processing machine $110_k$ by operating an emergency stop button in the operation unit 113 and thereby interrupts the process for the workpiece $W_2$. In either case, the monitoring unit 111a generates information about the fact that the processing machine was abnormally stopped and its time as an operating status and transmits the generated operating status to the system server 120 through the communication IF 112. If the communication is not established, the monitoring unit 111a temporarily stores the operating status in the information DB 116.

The operator OP enters the step K, i.e., the identifier of the step in which the abnormality occurred and a taking-out time (i.e., a time at which the workpiece was taken out) into the operation terminal 130. Then, the operator OP takes measures for the workpiece $W_2$ or for the processing machine $110_k$ in order to enable the workpiece $W_2$ to be put onto the production line again.

FIG. 8B shows a state in which the workpiece $W_2$ is put onto the production line 820 again so that it is processed by the processing machine $110_k$ again. It is assumed that at this point, the workpiece $W_3$ was already processed normally by the processing machine $110_k$ and is being conveyed subsequent to the workpiece $W_1$ toward the next step. That is, the workpiece $W_2$ is put between the workpieces $W_3$ and $W_4$.

Specifically, the operator OP waits for the process for the workpiece $W_3$, which is under way when the operator OP is about to put the workpiece $W_2$ onto the production line again, to be finished and then normally stops the processing machine $110_k$ by operating the operation unit 113. Then, after setting the workpiece $W_2$ at a predetermined position, the operator OP restarts the processing machine $110_k$ by operating the operation unit 113. Further, the operator OP enters the step K, i.e., the identifier of the step in which the abnormality occurred and a re-putting time (i.e., a time at which the workpiece was put onto the production line again) into the operation terminal 130. By this operation, a series of tasks from the taking-out of the workpiece $W_2$ to the re-putting thereof is completed. Therefore, the control unit 131 of the operation terminal 130 transmits terminal information indicating this series of tasks to the system server 120 through the communication IF 132. If the communication is not established, the control unit 131 temporarily stores the terminal information in the terminal DB 136.

FIG. 9 is a table showing an example of operating statuses of the processing machine $110_k$ in which a defect has occurred. The operating statuses are generated by the monitoring unit 111a of the processing machine $110_k$ as described above.

As shown in the figure, under the "Step K", which is the identifier ID of the step which the processing machine $110_k$ is in charge of, a list in which individual operating times and corresponding operating states are sequentially listed is created. FIG. 9 is merely an example of operating statuses created under the circumstance shown in FIG. 8. Although the operating statuses do not indicate relations with workpieces W, it can be interpreted that: the workpiece $W_1$ was normally processed at 13:02:01; an abnormal stop occurred during the process for the workpiece $W_2$ and the workpiece $W_2$ was taken out at 13:02:35; and the workpiece $W_3$ was normally processed at 13:06:15. Further, it can be interpreted that: the processing machine was stopped by an operation performed by the operator OP and the taken-out workpiece $W_2$ was put onto the production line again at 13:06:52; the workpiece $W_2$ was normally processed at 13:07:10; and the workpiece $W_4$ was normally processed at 13:07:53.

FIGS. 10A and 10B are diagrams showing examples of terminal information for a workpiece W in which a defect has occurred. The terminal information is generated by the control unit 131 of the operation terminal 130 as described above.

FIG. 10A shows an example of terminal information in which a taking-out time and a re-putting time entered by an operator OP are directly expressed. Specifically, as shown in the figure, under the "Step K", which is the identifier ID of the step which the processing machine $110_k$ is in charge of, a list in which a taking-out time and a re-putting time are associated with each other is created. FIG. 10B shows an example of terminal information which is expressed by a taking-out time entered by an operator OP and a taking-out time period which is a time period between the taking-out time and a re-putting time. Specifically, as shown in the figure, under the "Step K", which is the identifier ID of the step which the processing machine $110_k$ is in charge of, a list in which a taking-out time and a time period that is required before the re-putting are associated with each other is created.

As the associating unit 121a of the system server 120 acquires the operating statuses shown in FIG. 9 and the terminal information shown in FIG. 10, it can recognize that a workpiece W that was taken out in an abnormal stop that occurred at 13:02:35 was put onto the production line again in an arbitrary stop that occurred at 13:06:52 by checking these information items against each other. That is, the associating unit 121a can recognize that the workpiece $W_2$ was put between the workpieces $W_3$ and $W_4$ and thereby associate all the workpieces W conveyed on the production line 820 with their respective identifiers ID.

Figure 11:
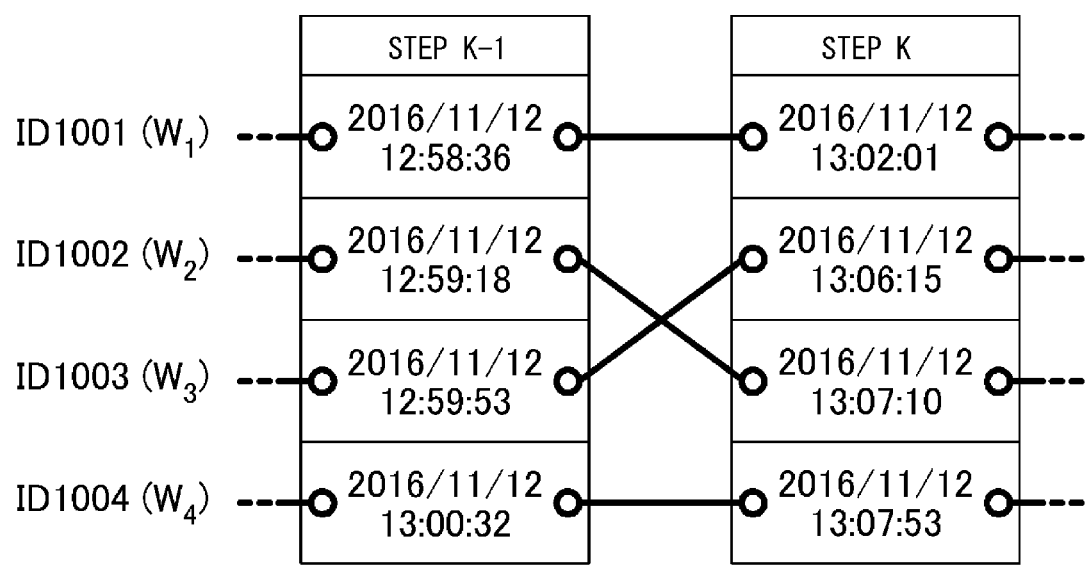
FIG. 11 is a diagram for explaining an example of association of workpieces after a defect has occurred in a workpiece.

FIG. 11 is a diagram in a format similar to that shown in FIG. 7 and for explaining association of workpieces W in the situation shown in FIG. 8. Up to the step K−1, workpieces are processed in the order in which they were put onto the production line 820. Then, when it is determined that the workpiece $W_2$ has been put between the workpieces $W_3$ and $W_4$ in the step K as described above, the association among the workpieces is corrected so that it indicates that the workpieces have been processed in the order of workpieces $W_1$, $W_3$, $W_2$ and $W_4$ in the step K.

Specifically, it is determined that the workpiece $W_1$ passed through the step K−1 at 12:58:36 and passed through the step K at 13:02:01, and an Identifier ID1001 is associated with the workpiece $W_1$. It is determined that the workpiece $W_2$ passed through the step K−1 at 12:59:18 and passed through the step K at 13:07:10, and an Identifier ID1002 is associated with the workpiece $W_2$. It is determined that the workpiece $W_3$ passed through the step K−1 at 12:59:53 and passed through the step K at 13:06:15, and an Identifier ID1003 is associated with the workpiece $W_3$. Further, it is determined that the workpiece $W_4$ passed through the step K−1 at 13:00:32 and passed through the step K at 13:07:53, and an Identifier ID1004 is associated with the workpiece $W_4$.

That is, when the system server 120 acquires the operating status indicating an interruption of an operation from one of the processing machines, it recognizes that a workpiece W corresponding to that processing machine has been taken out from the production line 820, advances the order of a workpiece W that has been conveyed subsequent to the workpiece W taken out from the production line 820, and thereby associates an operating status acquired from a processing machine disposed on the downstream side of that processing machine with the advanced workpiece W. Further, when the system server 120 recognizes that one of workpieces W has been taken out from one of the processing machines, it acquires information on a taking-out elapsed time that is a time elapsed before that workpiece W is put onto the production line 820 again, associates an operating status associated with an earliest time after the taking-out elapsed time has elapsed from a time associated with an interruption of an operation with the re-put workpiece W, and thereby identifies that workpiece W that is conveyed on the production line 820 again.

Figure 12:
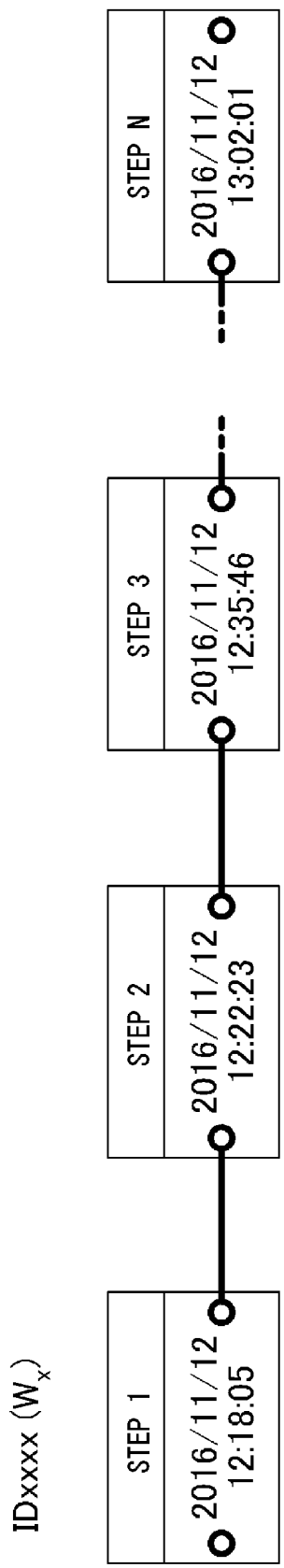
FIG. 12 shows identification information of individual workpieces.

When it is possible to obtain association between adjacent steps as described above, it is possible to determine an identifier ID for each workpiece W throughout all the steps from the step 1 to the step N on the production line 820. FIG. 12 shows an example of identification information of individual workpieces W. According to the identification information shown in the figure, an identifier IDxxxx is associated with a workpiece $W_x$ conveyed on the production line 820. Further, it can be understood that the workpiece $W_x$ passed through steps 1, 2 . . . , N at 12:18:05, 12:22:23, . . . , 13:02:01, respectively, and hence a series of processes has been completed. Further, even at an intermediate stage before the step N, it is possible to identify (i.e., distinguish) workpieces W that correspond to identifiers ID for which processing times in steps through which the workpieces W have already passed are recorded from other workpieces W. As described above, the system server 120 can acquire an operating status associated with a time from each of the processing machines, associate the acquired operating statuses with the plurality of workpieces W successively arriving at the processing machines, and thereby identify each of the plurality of workpieces W conveyed on the production line 820.

A more complicated example is explained. FIG. 13 is a table showing another example of operating statuses of the processing machine $110_k$ in which a defect has occurred. The table of operating statuses of the processing machine $110_k$ shown in the figure is in a format similar to that for the table of operating statuses shown in FIG. 9.

It can be interpreted from the operating statuses that: the workpiece $W_1$ was normally processed at 13:02:01; an abnormal stop occurred during the process for the workpiece $W_2$ and the workpiece $W_2$ was taken out at 13:02:35; and the workpiece $W_3$ was normally processed at 13:06:15. Further, it can be interpreted that: an abnormal stop occurred during the process for the workpiece $W_4$ and the workpiece $W_4$ was taken out at 13:06:52; and the workpiece $W_5$ was normally processed at 13:07:10.

Next, the processing machine is stopped by an operation performed by an operator OP at 13:07:53. However, since the workpieces $W_2$ and $W_4$ were already taken out, it is impossible to determine which of the workpieces W is put onto the production line again at this point based solely on the operating statuses. The workpiece W that is put onto the production line again at this point was normally processed at 13:08:05. Next, the processing machine is stopped by an operation performed by the operator OP at 13:08:20. The workpiece W that is put onto the production line again at this point is the remaining one of the workpieces $W_2$ and $W_4$, i.e., the workpiece W that was not put onto the production line again at 13:07:53. The workpiece W that is put onto the production line again at this point was normally processed at 13:08:30.

That is, the associating unit 121a cannot identify the workpieces $W_2$ and $W_4$ based solely on the information on the operating statuses. Therefore, the associating unit 121a uses terminal information of the operation terminal 130. FIG. 14 shows an example of terminal information that is used to cope with the above-described situation. As shown in the figure, the terminal information is created, under the "Step K", which is the identifier ID of the step performed by the processing machine $110_k$ from which the workpieces were taken out, as a list in which taking-out times, re-putting times, and temporary IDs are associated with each other.

For example, when the first workpiece W is taken out, a temporary ID k001 is assigned thereto. Then, when the workpiece W with the ID k001 assigned thereto is put onto the production line again, an operator OP enters a re-putting time while specifying the ID k001. That is, the operator OP associates the taking-out time with the re-putting time through the temporary ID. Referring to the terminal information in the figure, it can be understood that the workpiece W with the temporary ID k001, which was taken out from the production line earlier than the workpiece W with the temporary ID k002, was put onto the production line again later than the workpiece W with the temporary ID k002. Therefore, the associating unit 121a can determine that the normal process performed at 13:08:05 was performed for the workpiece $W_4$ and the normal process performed at 13:08:30 was performed for the workpiece $W_2$ by checking the aforementioned terminal information against the operating statuses shown in FIG. 13.

Figure 15:
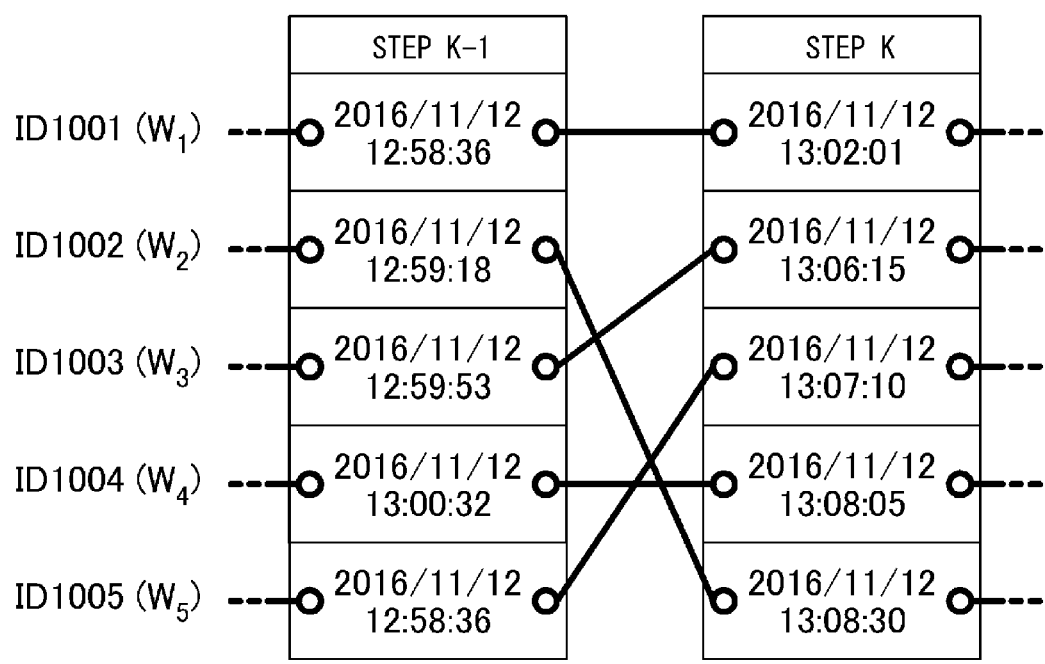
FIG. 15 is a diagram for explaining another example of association of workpieces after a defect has occurred in a workpiece.

FIG. 15 is a diagram in a format similar to that shown in FIG. 11 and for explaining association of workpieces W for the example shown in FIGS. 13 and 14. Up to the step K−1, workpieces are processed in the order in which they were put onto the production line 820. Then, when it is determined that the workpiece $W_2$ has been put behind the workpiece $W_4$ and the workpiece $W_4$ is put behind the workpiece $W_5$ in the step K as described above, the association among the workpieces is corrected so that it indicates that the workpieces have been processed in the order of workpieces $W_1$, $W_3$, $W_5$, $W_4$ and $W_2$ in the step K.

Figure 16:
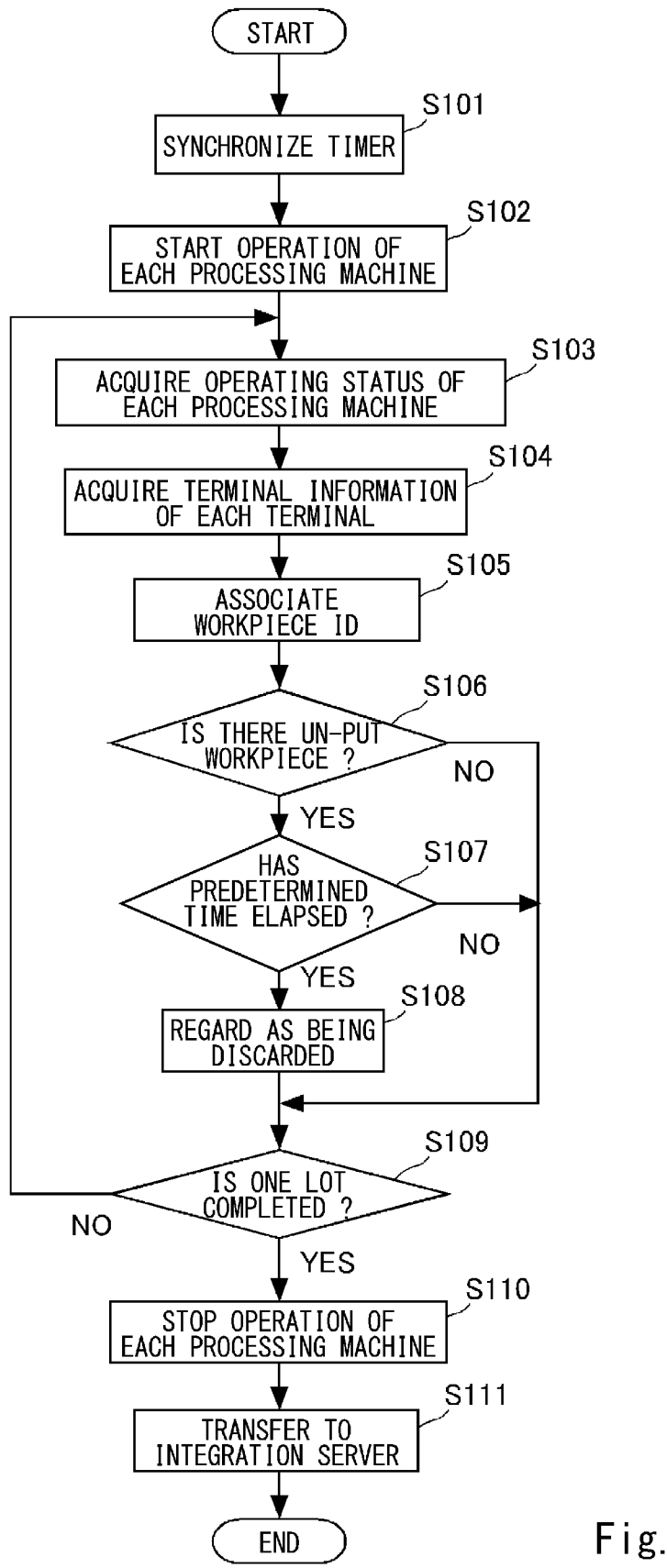
FIG. 16 is a flowchart showing a flow of processes performed by a system server.

Next, a flow of processes performed by the system server 120 is explained. FIG. 16 is a flowchart showing a flow of processes performed by the system server 120. The flow is started when an operation of the production line 820 is started.

In a step S101, the control unit 111 reads a time in the reference timer 125 and transmits the read time as a reference time to each processing machine 110 and each operation terminal 130. Each processing machine 110 updates the time of its timer 115 to the received reference time. Each operation terminal 130 updates the time of its timer 135 to the received reference time. As a result, the timers of the system server 120, each processing machine 110, and each operation terminal 130 are synchronized with each other.

Upon completing the task for synchronizing the timer, the control unit 121 moves to a step S102 and transmits an operation permission signal to each processing machine 110. Upon receiving the operation permission signal, each processing machine 110 starts to process workpieces W conveyed on the production line 820.

The control unit 121 acquires an operating status of each processing machine 110 in a step S103 and acquires terminal information of each operation terminal 130 in a step S104. Specifically, the monitoring unit 111a of each processing machine 110 generates an operating status every time a process is performed there and sends the generated operating status to the system server 120 through the intranet 210. The control unit 121 of the system server 120 successively receives operating statuses sent from respective processing machines 110 and updates operating statuses of those processing machines 110 stored in the management DB 126. The control unit 121 reads an operating status of a processing machine 110 of interest from the management DB 126 and thereby acquires the operating status at the timing of the step S103. Further, when the control unit 131 of each operation terminal 130 generates terminal information, it sends the generated terminal information to the system server 120 through the intranet 210. The control unit 121 of the system server 120 successively receives terminal information sent from respective operation terminals 130 and stores the received terminal information in the management DB 126. The control unit 121 selects and reads terminal information related to the processing machine 110 of interest and thereby acquires the terminal information at the timing of the step S104.

In a step S105, the associating unit 121a associates a corresponding identifier ID with each of workpieces W conveyed on the production line 820 by checking the acquired operating statuses and the acquired terminal information against each other. In this way, the associating unit 121a can identify each of the workpieces W conveyed on the production line 820. The associating unit 121a stores identification information generated by the above-described association in the management DB 126 and updates the stored identification information every time new association is made.

The associating unit 121a moves to a step S106 and determines whether or not there is a workpiece W that has been taken out from the production line but has not been put onto the production line again based on the operating status and the terminal information. When the associating unit 121a determines that there is no workpiece W that has not been put onto the production line again, it moves to a step S109, whereas when the associating unit 121a determines that there is a workpiece W that has not been put onto the production line again, it moves to a step S107.

When the associating unit 121a moves to the step S107, it checks how much time has elapsed since the workpiece W, which has not been put onto the production line again, was taken out. Then, when the checked elapsed time has not reached a predetermined length of time, the associating unit 121a moves to the step S109, whereas when the checked elapsed time has already reached the predetermined length of time, the associating unit 121a moves to a step S108. Note that, a length of time the workpiece is unlikely to be put onto the production line again any longer when which has elapsed is defined as the predetermined length of time in advance. When the associating unit 121a moves to the step S108, it regards the workpiece W of interest as a discarded workpiece. That is, the associating unit 121a recognizes the workpiece W of interest as a workpiece W that will not be contained in the finished product tray 830. The associating unit 121a generates identification information even for the discarded workpiece W and stores the generated identification information in the management DB 126.

In the step S109, the control unit 121 determines whether or not processes for one lot of workpieces W (i.e., a determined number of workpieces W) have been completed. For example, when the sum of the number of workpieces W that has reached the step N and the number of discarded workpieces W becomes equal to the number of workpieces W that were put onto the production line 820, the control unit 121 determines that the processes for one lot of workpieces W have been completed. When the control unit 121 determines that the processes have not been completed, it returns to the step S103 and repeats the above-described series of processes. When the control unit 121 determines that the processes have been completed, it moves to a step S110.

In the step S110, the control unit 121 transmits an operation stop signal to each processing machine 110 and thereby stops the operation of each processing machine 110. Then, in a step S111, the control unit 121 transfers the generated identification information to the integration server 140 and finishes the series of processes.

Figure 17:
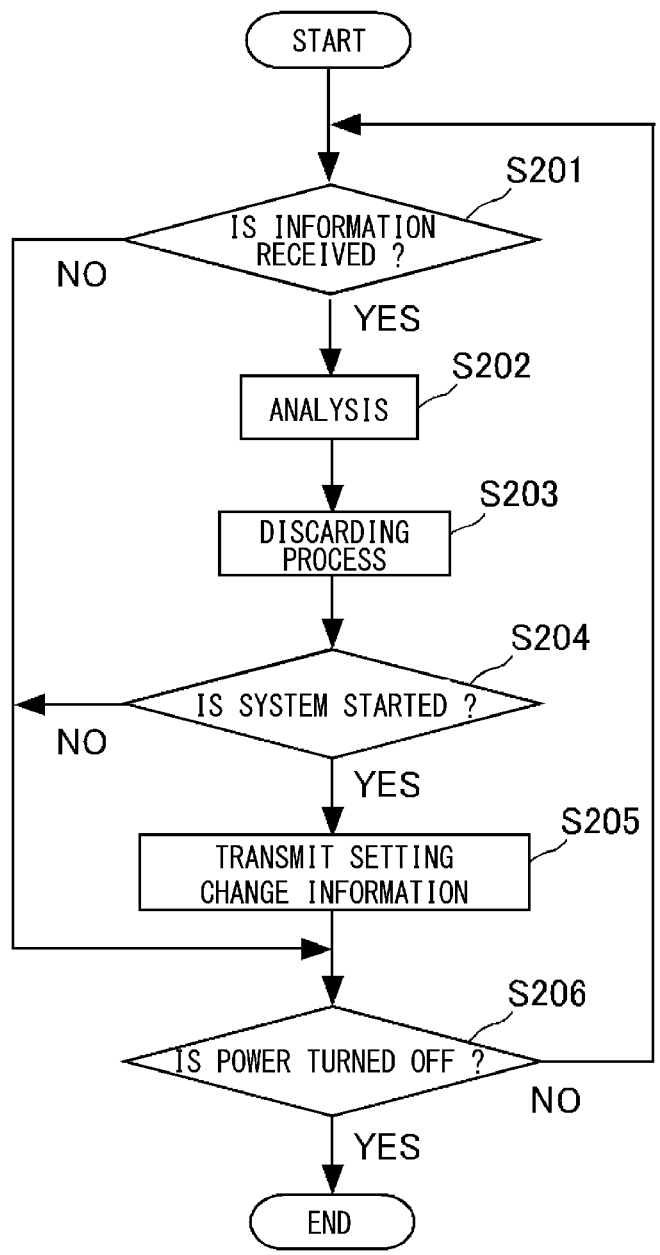
FIG. 17 is a flowchart showing a flow of processes performed by an integration server.

Next, a flow of processes performed by the integration server 140 is explained. FIG. 17 is a flowchart showing a flow of processes performed by the integration server 140. The flow is started when the power of the integration server 140 is turned on.

In a step S201, the control unit 141 of the integration server 140 determines whether or not it has received new identification information transferred from each system server 120. When the control unit 141 determines that it has not received any new identification information, it moves to a step S206, whereas when the control unit 141 determines that it has received new identification information, it moves to a step S202.

The data analysis unit 141b analyzes the received identification information. Specifically, the data analysis unit 141*b* analyzes a processing machine 110 in which defects frequently occur, a time period during which defects occur, and so on. If the data analysis unit 141*b* acquires information about the raw material for workpieces W, information about the ambient environment of the processing machine 110, etc., together with the identification information, it can analyze a correlation between occurrences of defects and the raw material, the environment, or the like. The analyzed information is shown to the manager of the production line or the like.

In a step S203, based on the acquired identification information, the discarding determination unit 141*a* determines, among the workpieces W, a workpiece W that is recognized to be taken out from one of the processing machines 110 but is recognized not to be put onto the production line 820 again as a discarded workpiece. If each system server 120 recognizes all the discarded workpieces without fail, no workpiece is newly determined as a discarded workpiece at this stage. However, if there are unnoticed discarded workpieces in any of the system servers 120, they are determined as discarded workpieces at this stage. Alternatively, each system server 120 may not perform the determination about discarded workpieces, and discarded workpieces may be determined at this stage.

In a step S204, the control unit 141 determines whether or not the operation of the production line 820 is started. When the control unit 141 determines that the operation is not started, it moves to a step S206. When the control unit 141 determines that the operation is started, it moves to a step S205.

In the step S205, the setting change unit 141*c* defines an optimal setting for the processing machine 110 based on a result of the analysis made by the data analysis unit 141*b* and changes the setting of the processing machine 110 of interest to the optimal setting through the system server 120.

In the step S206, the control unit 141 determines whether or not the power has been turned off. When the control unit 141 determines that the power has not been turned off, it returns to the step S201 and continues the series of processes. When the control unit 141 determines that the power has been turned off, it finishes the series of processes.

In the above-described embodiments, even in the case where taken-out workpieces are put onto the production line again in a reversed order, it is still possible to identify the workpieces by referring to the terminal information. However, the types of information items that are required to identify individual workpieces change according to the rule for the manufacturing process, the environment of the manufacturing process, and so on. For example, in the above-described embodiments, there is a precondition that each processing machine processes one workpiece at a time. However, this precondition is one of the rules for the manufacturing process. In the case where each processing machine processes a plurality of workpieces at a time and the processed workpieces are discharged together from the processing machine, additional information is required. Conversely, when a rule that "a workpiece that has been taken out earlier has to be put onto the production line again earlier" is provided, there is no need to obtain the association explained with reference to FIG. 15. Therefore, the terminal information is unnecessary. If at least an operating status associated with a time can be acquired in each processing machine 110, it is possible to identify each workpiece W.

Similarly, in the above-described embodiments, there is a precondition that when a taken-out workpiece is put onto the production line again, it is normally processed in the same processing machine from which that workpiece was taken out. However, when the normal process performed by this processing machine is skipped, information indicting the skip may be provided by the operation terminal or the like. Further, when the taken-out workpiece is put onto a processing machine different from the processing machine from which that workpiece was taken out, information about the step performed by the processing machine onto which the taken-out workpiece is put may be provided as necessary information.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A production control system comprising:
a plurality of processing machines configured to successively process a plurality of workpieces conveyed on a production line; and
a system server communicatively connected to the plurality of processing machines, wherein the system server comprises:
a processor configured to:
for each of the plurality of processing machines: (i) acquire an operating status of a processing machine of the plurality of processing machines for each of the plurality of workpieces that the processing machine processes, and (ii) associate the acquired operating status with an acquired operating time of the operating status, the operating time being a time that the workpiece is processed by the processing machine, and
identify each of the plurality of workpieces conveyed on the production line based on the associating of the acquired operating statuses with the acquired operating times, wherein the processor is further configured to identify each of the plurality of workpieces conveyed on the production line by:
when an operating status of the acquired operating statuses
indicates an abnormality or interruption of one of the plurality of processing machines, recognizing that a workpiece corresponding to the one of the plurality of processing machines has been taken out from the production line, advancing an order of a workpiece that has been conveyed subsequent to the workpiece taken out from the production line, and associating an operating status acquired from a processing machine disposed on a downstream side of that processing machine with the advanced workpiece, wherein the workpiece that has been conveyed subsequent to the workpiece taken out from the production line is different from the workpiece taken out from the production line, wherein the processor is further configured to: when a first workpiece is recognized as having been taken out from the one of the plurality of processing machines, acquire a taking-out elapsed time that is a time elapsed before the first workpiece is re-put onto the production line again, associate an operating status associated with an earliest time after the taking-out elapsed time has elapsed from a time associated with the abnormality or interruption of an operation of the one of the plurality of processing machines with the first workpiece, and identify that the first workpiece is conveyed on the production line again.

2. The production control system according to claim 1, further comprising an operation terminal configured to transmit terminal time information to the system server in response to an operation performed by a user.

3. The production control system according to claim 1, wherein when one of the plurality of workpieces has been taken out from the one of the plurality of processing machines but the system server has not been able to recognize that the one of the plurality of workpieces has been re-put onto the production line again before a predetermined time has elapsed, the system server regards the one of the plurality of workpieces as being a discarded workpiece.

4. The production control system according to claim 1, further comprising an integration server communicatively connected to the system server, wherein the processor is further configured to control a communication interface to transfer identification information of the plurality of workpieces to the integration server at a predetermined timing.

5. The production control system according to claim 4, wherein the integration server regards, among the plurality of workpieces, a workpiece that has been taken out from the one of the plurality of processing machines but has not been recognized as having been re-put onto the production line again as being a discarded workpiece.

6. The production control system according to claim 1, wherein at least one of the plurality of processing machines performs a predetermined process for each of the plurality of workpieces based on an identification status in the system server.

7. The production control system according to claim 1, wherein the identifying of each of the plurality of workpieces conveyed on the production line is based on an order of the plurality of workpieces.

8. A non-transitory computer readable medium that stores a production control program comprising computer-executable code configured to be executed by a system server communicatively connected to a plurality of processing machines, the plurality of processing machines being configured to successively process a plurality of workpieces conveyed on a production line, the computer-executable code being configured to cause a processor of the system server to:

for each of the plurality of processing machines: (i) acquire an operating status of a processing machine of the plurality of processing machines for each of the plurality of workpieces that the processing machine processes, and (ii) associate the acquired operating status with an acquired operating time of the operating status, the operating time being a time that the workpiece is processed by the processing machine, and identify each of the plurality of workpieces conveyed on the production line based on the associating of the acquired operating statuses with the acquired operating times, wherein the processor is further configured to identify each of the plurality of workpieces conveyed on the production line by: when an operating status of the acquired operating statuses indicates an abnormality or interruption of one of the plurality of processing machines, recognizing that a workpiece corresponding to the one of the plurality of processing machines has been taken out from the production line, advancing an order of a workpiece that has been conveyed subsequent to the workpiece taken out from the production line, and associating an operating status acquired from a processing machine disposed on a downstream side of that processing machine with the advanced workpiece, wherein the workpiece that has been conveyed subsequent to the workpiece taken out from the production line is different from the workpiece taken out from the production line, wherein the computer-executable code is further configured to cause the processor of the system server to: when a first workpiece is recognized as having been taken out from the one of the plurality of processing machines, acquire a taking-out elapsed time that is a time elapsed before the first workpiece is re-put onto the production line again, associate an operating status associated with an earliest time after the taking-out elapsed time has elapsed from a time associated with the abnormality or interruption of an operation of the one of the plurality of processing machines with the first workpiece, and identify that the first workpiece is conveyed on the production line again.

9. A production control method using a plurality of processing machines and a system server communicatively connected to the plurality of processing machines, the plurality of processing machines being configured to successively process a plurality of workpieces conveyed on a production line, the production control method comprising:

for each of the plurality of processing machines: (i) acquiring an operating status of a processing machine of the plurality of processing machines for each of the plurality of workpieces that the processing machine processes, and (ii) associating the acquired operating status with an acquired operating time of the operating status, the operating time being a time that the workpiece is processed by the processing machine, and identifying each of the plurality of workpieces conveyed on the production line based on the associating of the acquired operating statuses with the acquired operating times, wherein the identifying of each of the plurality of workpieces conveyed on the production line includes: when an operating status of the acquired operating statuses indicates an abnormality or interruption of one of the plurality of processing machines, recognizing that a workpiece corresponding to the one of the plurality of processing machines has been taken out from the production line, advancing an order of a workpiece that has been conveyed subsequent to the workpiece taken out from the production line, and associating an operating status acquired from a processing machine disposed on a downstream side of that processing machine with the advanced workpiece, wherein the workpiece that has been conveyed subsequent to the workpiece taken out from the production line is different from the workpiece taken out from the production line, wherein the production control method further comprises: when a first workpiece is recognized as having been taken out from the one of the plurality of processing machines, acquire a taking-out elapsed time that is a time elapsed before the first workpiece is re-put onto the production line again, associate an operating status associated with an earliest time after the taking-out elapsed time has elapsed from a time associated with the abnormality or interruption of an operation of the one of the plurality of processing machines with the first workpiece, and identify that the first workpiece is conveyed on the production line again.

10. The production control system according to claim 7, wherein the order of the plurality of workpieces is corrected based on the associating of the acquired operating statuses with the acquired operating times.

* * * * *